April 21, 1964          E. ENGLER          3,130,267
TELECAMERA CONTROL
Filed March 16, 1960
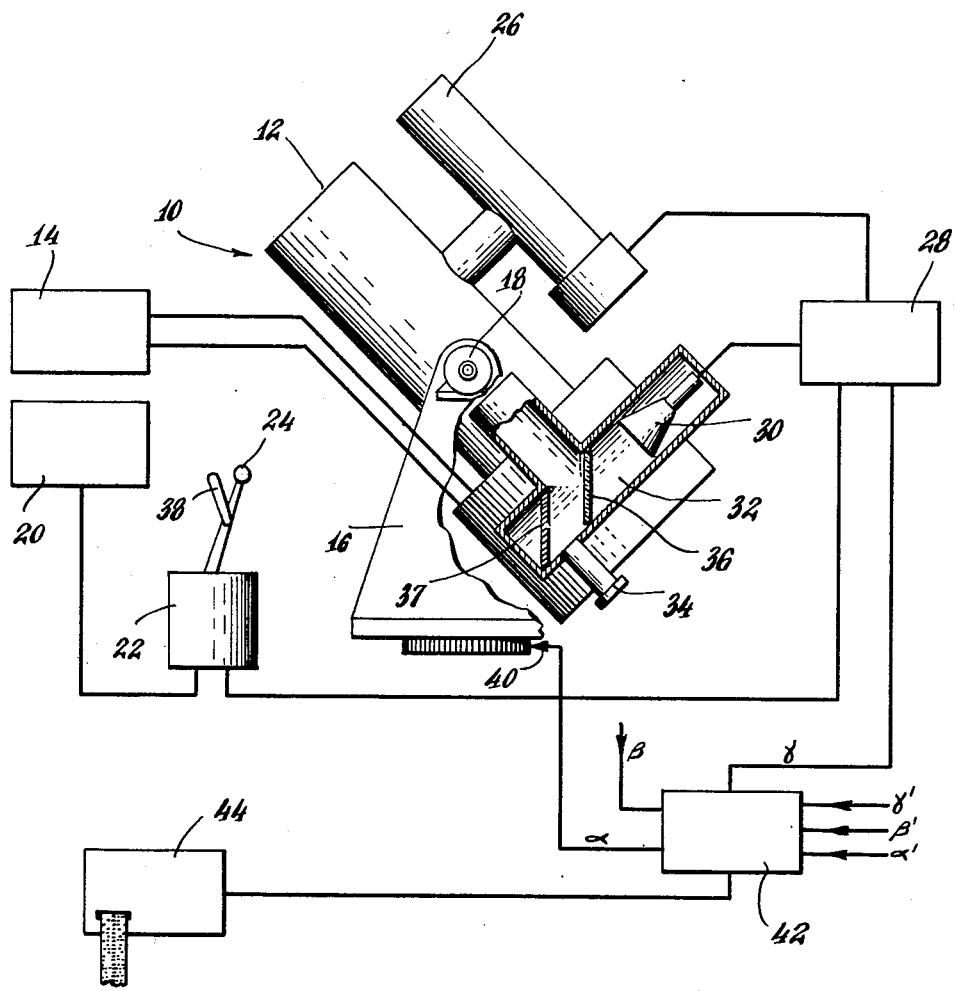
INVENTOR.
Ernst Engler
BY
*Gerald E. Brambles*
ATTORNEY.

3,130,267
TELECAMERA CONTROL
Ernst Engler, Nussdorf, near Uberlinger, See, Germany, assignor to Bodenseewerk, Perkin-Elmer & Co., G.m.b.H., Ueberlingen (Bodensee), Germany
Filed Mar. 16, 1960, Ser. No. 15,414
Claims priority, application Germany Mar. 19, 1959
2 Claims. (Cl. 178—6.8)

This invention relates to telecamera control means and more particularly to apparatus for automatically controlling the viewing direction of cinetheodolites.

Cinetheodolites are well-known devices used for tracking and photographing moving objects. The theodolite produces a signal which may then be used to compute the position of the moving object in space. One such method of photographing and measuring the spatial coordinates of such targets is by the "double transit" method. This procedure involves the use of at least two theodolites. The operator or operators use manual handwheels to keep the target aligned with the cross hairs of a sighting telescope connected with each theodolite.

Each theodolite is provided with a series of concentric graduated circles which are photographed on the same film as the object being tracked. The position of the object against these circles permits a corrected computation of the object's position by including in such computaton, not only the sighting direction of the theodolite, but also any deviation of the target from the optical line of sight. It has been found to be quite difficult for an operator using a telecamera or cinetheodolite having a long focal length to follow rapidly-moving targets by handwheel manipulation. One method of simplifying the tracking problem is to replace the handwheels by a control stick. By merely exerting pressure on the stick in the proper direction, both elevation and azimuth may be changed with controlled speed and acceleration.

Radar control is also used in conjunction with cinetheodolites and telecameras. However, radar is capable of achieving only moderate accuracy at considerable expense.

It will also be apparent that the cruder methods of control must of necessity result in the use of relatively large film sizes. This is due to the fact that deviation of the target from the optical axis will be greater than if more accurate means of control were available.

It is, therefore, the primary object of the present invention to provide improved control means for telecameras and cinetheodolites. Other objects are to provide such control means capable of higher accuracy than is presently available; to provide such control means making practicable the use of smaller film sizes; to provide such control means capable of following rapidly-moving targets with instruments having long focal lengths; and to provide such apparatus having high accuracy at low cost.

The above objects are achieved by providing on an optical tracking instrument an auxiliary camera capable of producing a secondary image of the field of view. The secondary image is electronically scanned and control signals are thereby produced which are utilized for control of the tracking instrument.

In accordance with the invention, electrical control signals derived from electronically scanning the secondary image are fed to a control center. The control center produces a controlling current in accordance with its input. A manually operated control signal transmitter is also provided. The manually operated transmitter includes a change-over switch by means of which either the automatic signal transmitter or the manually operated signal transmitter may be selectively disconnected.

It thus becomes possible to direct the optical instrument onto the target by means of manual operation. Once the target is detected, the instrument may be switched to automatic control.

As an auxiliary camera, a television camera may be mounted on the tracking instrument and a television receiver aligned with the sighting telescope. By means of a half-silvered mirror, the field of view recorded by the television camera is superimposed upon the field of view of the tracking instrument. The operator is thus able to see the two fields superimposed, one upon the other. In addition to the televised image, the television apparatus may also be employed to reproduce visually the controlling signals for the tracking instrument. The operator is then able to change from manual to automatic target tracking at a time when regularly occurring control signals are superimposed on the televised image.

The apparatus of the invention is particularly advantageous for rapidly evaluating the trajectory of a moving object. For this purpose, a plurality of cinetheodolites are connected to a computer. The computer ascertains the spatial coordinates of the target from the electrical signals proportional to azimuth and elevation. The accuracy obtained by this method is somewhat less than obtained by optical evaluation. However, this method enables an operator to limit his optical evaluations to a particular portion of the trajectory.

The apparatus of the invention will be more clearly understood by reference to the following description taken in conjunction with the single figure of the attached drawing which is a partially schematic view of an apparatus embodying the invention.

The cinetheodolite produces an image of the field of view produced by a lens system 12 having a relatively long focal length. The field of view is recorded on a photographic film in the usual manner, superimposed upon the images of concentric graduated circles. The triggering circuit 14 operates both the exposure shutter of the cinetheodolite and the flash lamps used for illuminating the graduated circles in synchronism with other cinetheodolites tracking the same target. Cinetheodolite 10 is rotatable around an azimuth axis on bracket 16 and around an axis of elevation by variable electric motors. Motor 18 for controlling elevation angle is represented. The tracking motors are controlled from a control center 20. Control center 20 receives input signals from a control signal transmitter 22 which may be manually operated by means of a control lever 24.

A television camera 26 is rigidly connected to the cinetheodolite. Camera 26 contains an optical system, preferably of short focal length, which forms an image of the field of view on the collecting electrode of the camera. The image so formed is electronically scanned and produces azimuth and elevational control signals which are transmitted to control signal transmitter 28. The detail of this scanning and control signal producing system form no part of the present invention and are therefore shown in block form. For the details of these elements, reference is made to applicant's co-pending patent application S.N. 2,152, filed January 13, 1960, now Patent No. 3,046,332. These azimuth and control signals are proportional to the displacement of the target image from the optical line of sight and are also fed to the receiver 30 of the television apparatus.

A sighting telescope 32 having an eyepiece 34 is fitted to cinetheodolite 10. By means of half-silvered mirror 36 and mirror 37, the optical image produced by telescope 32 and the controlling signals from receiver 30 are superimposed. At any desired time, as determined by the operator, the control signal from transmitter 28 may be directly connected to motor control center 20 in place of the manually operated transmitter 22. This change-over from manual to automatic operation is effected by a change-over lever 38 fitted to the control stick 24.

By operating control stick 24, the cinetheodolite, together with the television camera, is directed to the target and follows it until regularly-occurring control signals are observed through the eyepiece 34 of sighting telescope 32. Control signal transmitter 28 is then connected directly to control center 20 by the operation of lever 38 so that the cinetheodolite automatically follows the target.

An electrical pick-off 40 on each theodolite provides a signal $\alpha$ to computer 42 proportional to the azimuth angle of that particular cinetheodolite. Similarly, a signal $\beta$ proportional to elevation is provided. At the same time, a signal $\gamma$ is produced by control signal transmitter 28 proportional to the displacement between the target image and the optical axis. This signal is similarly fed to computer 42. Similar inputs, such as $\alpha'$, $\beta'$ and $\gamma'$, are received from another cinetheodolite. The computer is then able to calculate the actual spatial coordinates of the target and record the results by means of rapid printer 44. The recording device must be suitably synchronized with the triggering circuit 14 in order to match the photographs with the recorded values. This may be accomplished by storing the flash pulses and the controlling signals in the computer.

It is to be understood that the foregoing description is illustrative of one embodiment of the invention. The invention is not to be construed as so limited but is limited only by the scope of the following claims.

I claim:

1. Apparatus for the control of a cinetheodolite which comprises television camera means positioned to follow the movements of the cinetheodolite and produce control signals proportional to the position of a televised object; television receiver means adapted to provide a visual image of the field of view of said camera means; sighting telescope means on said cinetheodolite adapted to provide an optical image of its field of view to an observer; means for superimposing upon said optical image the visual image of said television receiver means; azimuth signal producing means adapted to produce signals proportional to the azimuthal direction of said cinetheodolite; elevation signal producing means adapted to produce signals proportional to the angle of elevation of said cinetheododilte; computing means adapted to receive all of said control signals, azimuth signals, and elevation signals and compute the spatial coordinates of a target object; and means responsive to said control signals to train the cinetheodolite on the target object.

2. Apparatus for the control of a telecamera which comprises auxiliary camera means positioned to follow the movements of the telecamera and produce a secondary image of the field of view; means for scanning said secondary image to produce signals proportional to the position of a target object; first control signal transmitter means responsive to said signals to produce first control signals proportional thereto; second control signal transmitter means responsive to manual input to produce second control signals proportional thereto; control center means adapted to receive either of said first and second control signals and produce motor control signals proportional thereto; selective switch means for alternatively applying either of said first and second control signals to said control center means; and motor means responsive to the output of said control center means to position said telecamera.

References Cited in the file of this patent

UNITED STATES PATENTS

| | | |
|---|---|---|
| 2,403,023 | Reynolds | July 2, 1946 |
| 2,581,589 | Herbst | Jan. 8, 1952 |
| 2,734,269 | Claret | Feb. 14, 1956 |
| 2,966,823 | Trimble | Jan. 3, 1961 |
| 3,010,024 | Barnett | Nov. 21, 1961 |